United States Patent
Ozaki

(10) Patent No.: US 7,638,896 B2
(45) Date of Patent: Dec. 29, 2009

(54) IN-VEHICLE ELECTRONIC SYSTEM, IN-VEHICLE ELECTRONIC APPARATUS AND METHOD OF CONTROLLING POWER SUPPLY OF PORTABLE ELECTRONIC DEVICE

(75) Inventor: Yukisuke Ozaki, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 11/645,629

(22) Filed: Dec. 27, 2006

(65) Prior Publication Data

US 2008/0129114 A1   Jun. 5, 2008

(30) Foreign Application Priority Data

Dec. 4, 2006   (JP) .............................. 2006-327663

(51) Int. Cl.
*B60L 1/00*   (2006.01)
*H02G 3/00*   (2006.01)
*G01R 1/20*   (2006.01)

(52) U.S. Cl. .......................... 307/9.1; 307/154; 710/303

(58) Field of Classification Search ................. 307/154, 307/9.1
See application file for complete search history.

(56) References Cited

U.S. PATENT DOCUMENTS

| | | | |
|---|---|---|---|
| 4,542,421 A | 9/1985 | Fujibayashi | |
| 4,733,356 A | 3/1988 | Haeussermann et al. | |
| 5,493,479 A | 2/1996 | Takahashi | |
| 5,510,957 A | 4/1996 | Takagi | |
| 5,537,673 A | 7/1996 | Nagashima et al. | |
| 5,592,389 A | 1/1997 | La Rue et al. | |
| 5,627,547 A | 5/1997 | Ramaswamy et al. | |
| 5,705,975 A | 1/1998 | Serino et al. | |
| 5,774,828 A | 6/1998 | Brunts et al. | |
| 5,794,164 A | 8/1998 | Beckert et al. | |
| 5,845,282 A * | 12/1998 | Alley et al. | .................... 707/10 |
| 5,862,468 A | 1/1999 | Kim | |
| 5,917,435 A | 6/1999 | Kamiya et al. | |
| 5,941,933 A | 8/1999 | Miyake et al. | |
| 5,964,821 A | 10/1999 | Brunts et al. | |
| 5,999,126 A | 12/1999 | Ito | |
| 6,009,355 A | 12/1999 | Obradovich et al. | |
| 6,023,290 A | 2/2000 | Seita | |
| 6,055,478 A | 4/2000 | Heron | |

(Continued)

FOREIGN PATENT DOCUMENTS

DE   198 03 178 A1   7/1999

(Continued)

OTHER PUBLICATIONS

U.S. Appl. No. 11,645,642, filed in the U.S.P.T.O. on Dec. 27, 2006.

(Continued)

*Primary Examiner*—Albert W Paladini
*Assistant Examiner*—Hal I Kaplan
(74) *Attorney, Agent, or Firm*—Oliff & Berridge, PLC

(57) ABSTRACT

An in-vehicle electronic system includes: an in-vehicle electronic apparatus mounted in a vehicle; and a portable electronic apparatus detachably provided to the in-vehicle electronic apparatus, and the in-vehicle electronic apparatus causes the portable electronic apparatus to be operable, when the in-vehicle electronic apparatus being operable detects attachment of the portable electronic apparatus.

18 Claims, 8 Drawing Sheets

U.S. PATENT DOCUMENTS

| | | | |
|---|---|---|---|
| 6,091,956 A | 7/2000 | Hollenberg |
| 6,093,977 A | 7/2000 | Fujita et al. |
| 6,119,060 A | 9/2000 | Takayama et al. |
| 6,125,326 A | 9/2000 | Ohmura et al. |
| 6,148,253 A | 11/2000 | Taguchi et al. |
| 6,150,925 A | 11/2000 | Casazza |
| 6,163,079 A | 12/2000 | Miyazaki et al. |
| 6,202,008 B1 | 3/2001 | Beckert et al. |
| 6,208,932 B1 | 3/2001 | Ohmura et al. |
| 6,243,645 B1 | 6/2001 | Moteki et al. |
| 6,405,049 B2 | 6/2002 | Herrod et al. |
| 6,417,786 B2 | 7/2002 | Learman et al. |
| 6,421,606 B1 | 7/2002 | Asai et al. |
| 6,681,176 B2 | 1/2004 | Funk et al. |
| 6,701,161 B1 | 3/2004 | Wendling |
| 6,791,844 B2 | 9/2004 | Tobishima et al. |
| 6,816,783 B2 | 11/2004 | Hashima et al. |
| 6,993,615 B2 | 1/2006 | Falcon |
| 7,006,845 B2 | 2/2006 | Simon |
| 7,016,986 B2 | 3/2006 | Fasolt |
| 7,062,378 B2 | 6/2006 | Krull et al. |
| 7,079,863 B2 | 7/2006 | Chikaishi |
| 7,117,286 B2 | 10/2006 | Falcon |
| 7,184,003 B2 | 2/2007 | Cupps et al. |
| 7,215,950 B2 | 5/2007 | Mazzara, Jr. et al. |
| 7,216,242 B2 | 5/2007 | Glass et al. |
| 7,222,207 B2 | 5/2007 | Falcon |
| 2002/0024597 A1 | 2/2002 | Arai et al. |
| 2002/0068549 A1 | 6/2002 | Tendler |
| 2002/0137541 A1 | 9/2002 | Lepley et al. |
| 2002/0152027 A1 | 10/2002 | Allen |
| 2003/0022624 A1 | 1/2003 | Sato |
| 2003/0103634 A1 | 6/2003 | Ito |
| 2004/0058656 A1 | 3/2004 | Chikaishi |
| 2004/0204159 A1 | 10/2004 | Van Bosch |
| 2004/0247280 A1 | 12/2004 | Izawa |
| 2005/0139731 A1 | 6/2005 | Park et al. |
| 2006/0031617 A1 | 2/2006 | Falcon |
| 2008/0130206 A1 | 6/2008 | Itoh |
| 2008/0161047 A1 | 7/2008 | Witkowski et al. |

FOREIGN PATENT DOCUMENTS

| | | |
|---|---|---|
| EP | 0 507 990 A1 | 10/1992 |
| EP | 0658011 A | 6/1995 |
| EP | 1 251 034 A2 | 10/2002 |
| EP | 1 727 019 A1 | 11/2006 |
| GB | 2 287 501 A | 9/1995 |
| GB | 2 336 489 A | 10/1999 |
| JP | U-57-204770 | 6/1956 |
| JP | Y-63-018184 | 1/1988 |
| JP | A 04-238218 | 8/1992 |
| JP | A 07-074479 | 3/1995 |
| JP | A-07-132779 | 5/1995 |
| JP | A-07-156719 | 6/1995 |
| JP | A 08-007977 | 1/1996 |
| JP | A 08-260794 | 10/1996 |
| JP | 08-318792 | 12/1996 |
| JP | A 08-318792 | 12/1996 |
| JP | A 10-16654 | 1/1998 |
| JP | A 10-103999 | 4/1998 |
| JP | A 10-135669 | 5/1998 |
| JP | A 10-199220 | 7/1998 |
| JP | A 11-289173 | 10/1999 |
| JP | 2000-311029 A | 11/2000 |
| JP | 2001-015936 | 1/2001 |
| JP | A-2001-052473 | 2/2001 |
| JP | 2001-141471 A | 5/2001 |
| JP | A 2001-239895 | 9/2001 |
| JP | A-10-2001-0112146 | 12/2001 |
| JP | A-2002-74922 | 3/2002 |
| JP | A 2002-181555 | 6/2002 |
| JP | A 2002-267461 | 9/2002 |
| JP | A 2002-328026 | 11/2002 |
| JP | 2003-035554 A | 2/2003 |
| JP | 2003-037514 A | 2/2003 |
| JP | A 2003-166848 | 6/2003 |
| JP | 2003-521825 | 7/2003 |
| JP | A-2003-308686 | 10/2003 |
| JP | 2003-315065 A | 11/2003 |
| JP | 2004-234794 | 8/2004 |
| JP | 2005-173653 A | 6/2005 |
| JP | A 2005-524570 | 8/2005 |
| KR | 10-2003-0071743 A | 9/2003 |
| KR | 10-2004-0061642 A | 7/2004 |
| KR | 20-0372059 Y1 | 1/2005 |
| KR | 10-2005-0017296 A | 2/2005 |
| KR | 10-2005-0072425 A | 7/2005 |
| KR | 10-2006-0030344 | 4/2006 |
| KR | 2006-128470 A | 12/2006 |
| WO | WO 95/19030 | 7/1995 |
| WO | WO 98/39852 | 9/1998 |
| WO | WO 99/38728 | 8/1999 |
| WO | WO 2006/130784 A2 | 12/2006 |

OTHER PUBLICATIONS

U.S. Appl. No. 11,645,628, filed in the U.S.P.T.O. on Dec. 27, 2006.
U.S. Appl. No. 11,646,539, filed in the U.S.P.T.O. on Dec. 28, 2006.
U.S. Appl. No. 11,646,477, filed in the U.S.P.T.O. on Dec. 28, 2006.
U.S. Appl. No. 11,646,566, filed in the U.S.P.T.O. on Dec. 28, 2006.
U.S. Appl. No. 11,645,672, filed in the U.S.P.T.O. on Dec. 27, 2006.
U.S. Appl. No. 11,646,557, filed in the U.S.P.T.O. on Dec. 28, 2006.
U.S. Appl. No. 11,646,478, filed in the U.S.P.T.O. on Dec. 28, 2006.
U.S. Appl. No. 11,646,558, filed in the U.S.P.T.O. on Dec. 28, 2006.
U.S. Appl. No. 11,646,498, filed in the U.S.P.T.O. on Dec. 28, 2006.
U.S. Appl. No. 11,646,538, filed in the U.S.P.T.O. on Dec. 28, 2006.
U.S. Appl. No. 11,646,479, filed in the U.S.P.T.O. on Dec. 28, 2006.
M. Mukasa. "Detachable-Panel Connectors Respond to Needs for Anti-Theft Designs," JEE Journal of Electronic Engineering 30, Feb. 1993, No. 314, Tokyo, Japan.

* cited by examiner

IN-VEHICLE ELECTRONIC SYSTEM, IN-VEHICLE ELECTRONIC APPARATUS AND METHOD OF CONTROLLING POWER SUPPLY OF PORTABLE ELECTRONIC DEVICE

BACKGROUND OF THE INVENTION

1. Field of the Invention

This invention relates to an in-vehicle electronic apparatus in which a portable electronic apparatus is detachably provided.

2. Description of the Related Art

As conventional navigation apparatuses, there are widely known small-sized portable navigation apparatuses with simplified structure and portability, also known as Personal Navigation Device (hereinafter, referred to as PND); and in-vehicle navigation apparatuses accommodated and fixed in a recess portion (DIN opening) formed in a dashboard of a vehicle. The in-vehicle navigation apparatuses are capable of guiding with high accuracy by use of the information supplied from vehicles such as vehicle speed, and some of the in-vehicle navigation apparatuses are equipped with audio devices.

In recent years, there have been proposed an audio navigation system with both portability of the PND type navigation apparatus and high-accuracy guide function of the in-vehicle navigation apparatus. This audio navigation system is provided with an audio portion and a navigation portion, and the main body thereof is accommodated and fixed in the DIN opening of the vehicle. However, the navigation portion is removable from the audio portion. The removed navigation portion is configured such that the power supply is equipped therein and the navigation is enabled with the navigation portion removed.

Accordingly, in the audio navigation system equipped with the detachable navigation portion, how to improve the user friendliness remains to be solved.

Japanese Patent Application Publication No. 10-199220 discloses a technique of turning off the power supply of the car audio main body, when the panel of the car audio is removed from the main body thereof.

As disclosed in Japanese Patent Application Publication No. 10-103999, the navigation apparatus includes a main navigation apparatus mounted and fixed in a vehicle and a sub navigation apparatus detachably provided in the vehicle. The sub navigation apparatus is powered on by the operation of an operation switch and the navigation is performed.

However, according to a technique disclosed in Japanese Patent Application Publication No. 10-199220, when the panel is removed from the car audio main body, the power supply of the car audio main body is just turned off to prevent the forgetting to turn off the power supply of the car audio main body. The technique does not focus on a technical challenge for the improvement of the user-friendliness of at what timing the power on and off of the apparatus removed from the main body should be changed.

Japanese Patent Application Publication No. 10-103999 also describes the technique for changing on and off of the power of the sub navigation apparatus by means of the operation of the operation switch, and does not address the above-described challenge.

SUMMARY OF THE INVENTION

The present invention has been made in view of the above circumstances and provides an in-vehicle electronic system, an in-vehicle electronic apparatus, and a method of controlling power supply of a portable electronic apparatus, by which the portable electronic apparatus detachable from the main body of the apparatus can be powered on or off at an effective timing for a user.

According to an aspect of the present invention, there is provided an in-vehicle electronic system including: an in-vehicle electronic apparatus mounted in a vehicle; and a portable electronic apparatus detachably provided to the in-vehicle electronic apparatus, and the in-vehicle electronic apparatus causes the portable electronic apparatus to be operable, when the in-vehicle electronic apparatus being operable detects attachment of the portable electronic apparatus. By performing this, when the portable electronic apparatus is attached to the in-vehicle electronic apparatus, the portable electronic apparatus becomes operable immediately, thereby causing the portable electronic apparatus to be operable at once, when the portable electronic apparatus is brought into a vehicle. It is therefore possible to improve the user-friendliness.

According to another aspect of the present invention, there is provided an in-vehicle electronic apparatus mounted in a vehicle and detachably provided with a portable electronic apparatus, the in-vehicle electronic apparatus including: a detecting portion detecting attachment of the portable electronic apparatus; and a controller powering on the portable electronic apparatus when detecting the attachment of the portable electronic apparatus. By performing this, when the portable electronic apparatus is attached to the in-vehicle electronic apparatus, the portable electronic apparatus becomes operable immediately, thereby causing the portable electronic apparatus to be operable at once, when the portable electronic apparatus is brought into a vehicle. It is therefore possible to improve the user-friendliness.

According to yet another aspect of the present invention, there is provided a method of controlling power supplied to a portable electronic apparatus detachably provided in an in-vehicle electronic apparatus, the method including: detecting attachment of the portable electronic apparatus; and powering on the portable electronic apparatus when the attachment of the portable electronic apparatus is detected. By performing this, when the portable electronic apparatus is attached to the in-vehicle electronic apparatus, the portable electronic apparatus becomes operable immediately, thereby causing the portable electronic apparatus to be operable at once, when the portable electronic apparatus is brought into a vehicle. It is therefore possible to improve the user-friendliness.

BRIEF DESCRIPTION OF THE DRAWINGS

Exemplary embodiments of the present invention will be described in detail with reference to the following drawings, wherein.

DESCRIPTION OF THE PREFERRED EMBODIMENTS

A description will now be given, with reference to the accompanying drawings, of exemplary embodiments of the present invention.

Exemplary Embodiment

Figure 1:
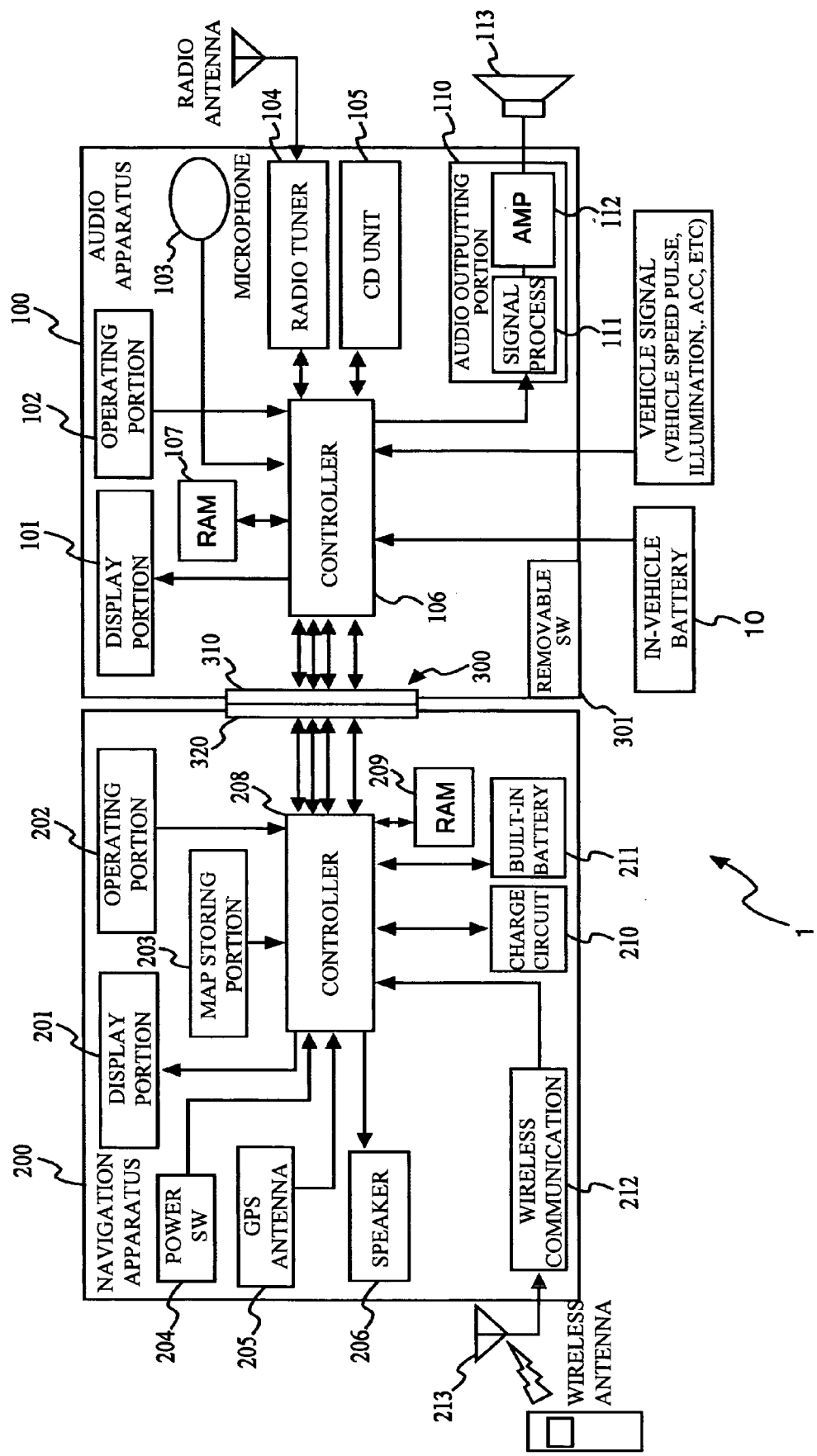
FIG. 1 is a view showing a configuration of an audio navigation system.

FIG. 1 is a view showing a configuration of an audio and navigation system 1.

The audio and navigation system 1 employed in the present exemplary embodiment includes: an audio apparatus 100 mounted in a vehicle; and a navigation apparatus 200 detachably provided in the audio apparatus 100. The navigation apparatus 200 is connected to the audio apparatus 100 by a connector portion 300.

Figure 2A:
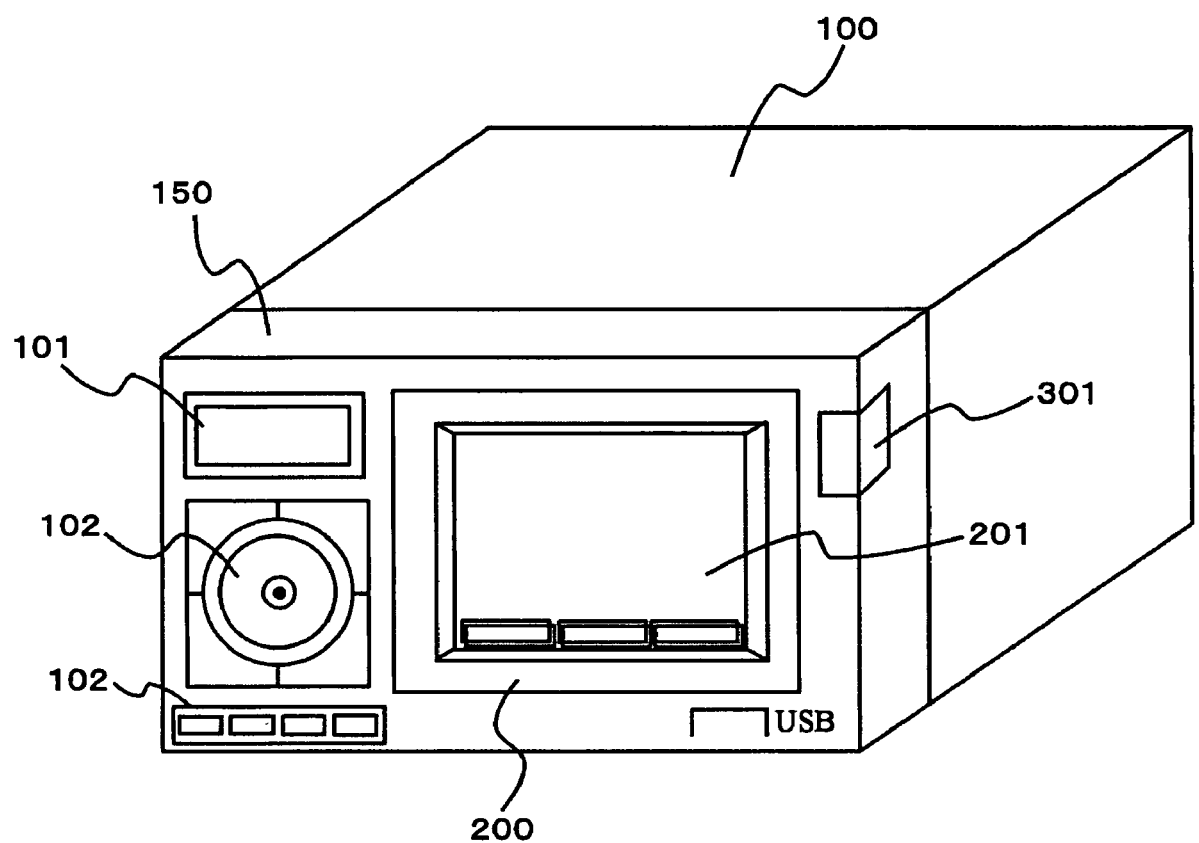
FIG. 2A shows an exterior shape of the audio navigation system.
Figure 2B:
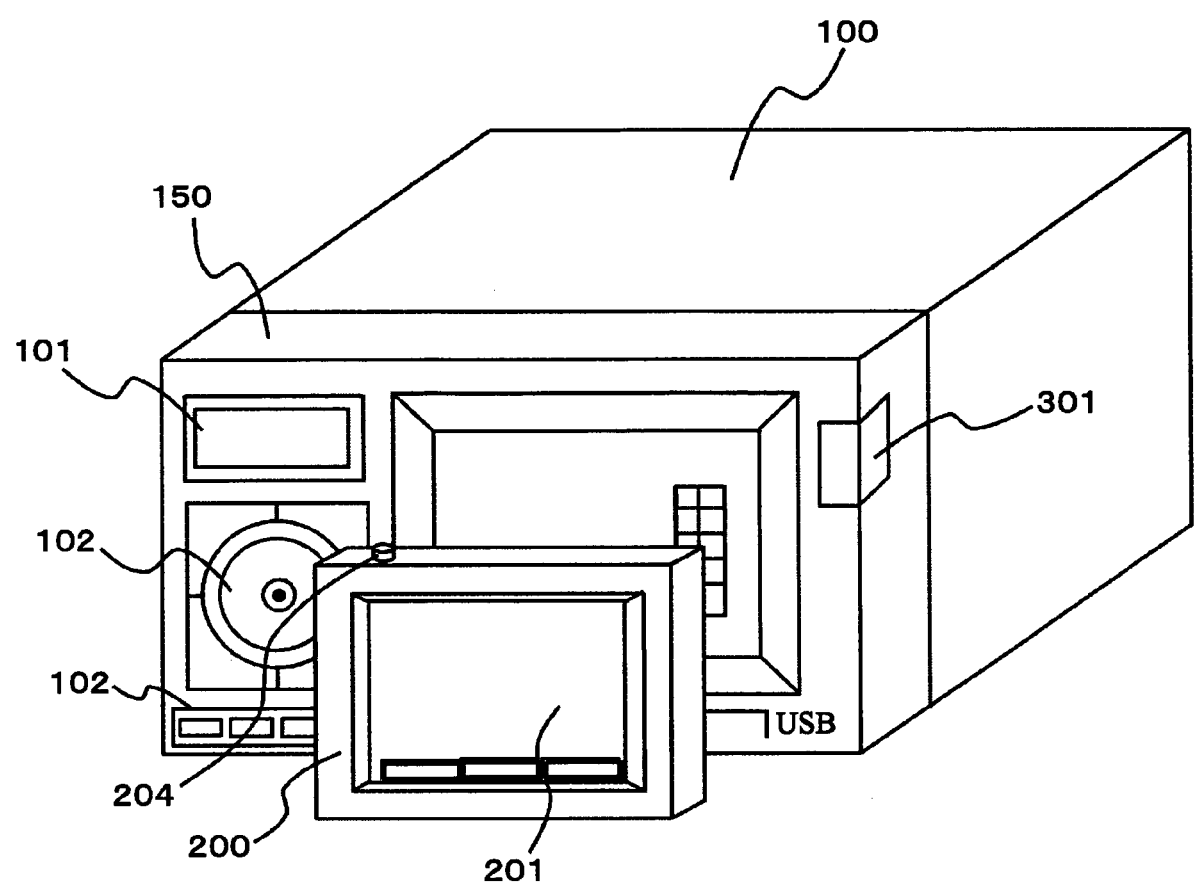
FIG. 2B is a view showing a navigation apparatus taken out of an audio apparatus.

FIG. 2A shows an exterior shape of the audio and navigation system 1. The navigation apparatus 200 is fitted to a front face panel 150 of the audio apparatus 100. Also, the navigation apparatus 200 can be taken out of the audio apparatus 100 as shown in FIG. 2B and used alone as a single unit. The front face panel 150 of the audio apparatus 100 is provided with: in addition to the navigation apparatus 200; a display portion 101; an operating portion 102 for operating the audio apparatus 100; and the like.

Figure 3:
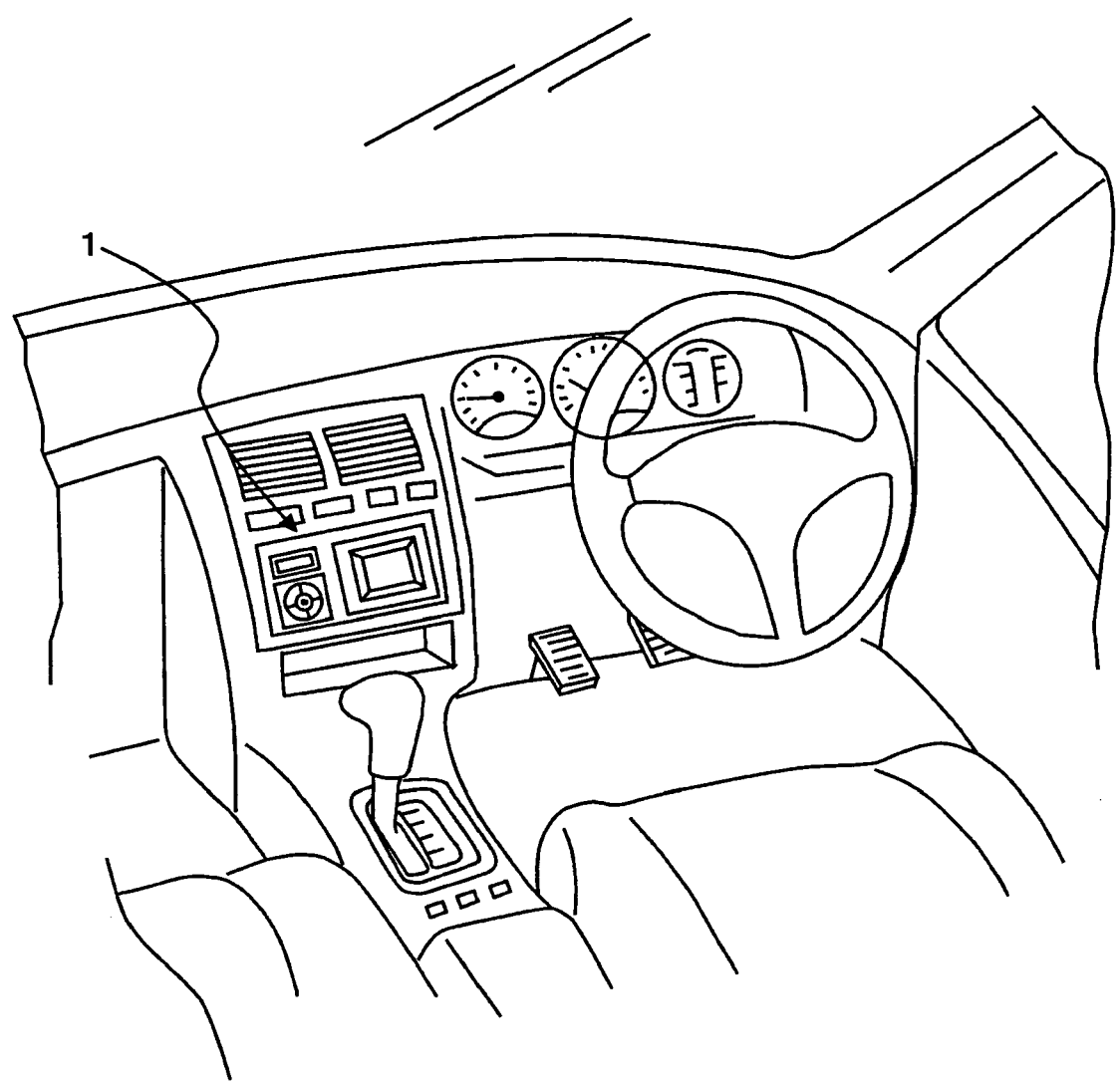
FIG. 3 is a view showing the audio navigation system accommodated in a 2DIN opening of a vehicle.

The audio and navigation system 1 shown in FIG. 2A is accommodated and fixed in a 2DIN opening of a vehicle, as shown in FIG. 3.

Referring back to FIG. 1, a description will be given of a configuration of each of components. The audio apparatus 100 is provided with: the display portion 101; the operating portion 102; a microphone 103; a radio tuner 104; a CD (Compact Disk) unit 105; a controller 106; a RAM (Random Access Memory) 107; and an audio outputting portion 110.

The display portion 101 of the audio apparatus 100 is capable of displaying music information, play time, and the like. With-the operating portion 102, it is possible to operate the CD unit 105 or the radio tuner 104 for selecting a song to be played by the audio apparatus 100, a broadcast program to be received, or the like.

The radio tuner 104 and the CD unit 105 are audio sources, and in addition, an MD unit or a cassette recorder may be provided. When any of the radio tuner 104 and the CD unit 105 is selected by the operating portion 102 as an operation target, the controller 106 outputs a signal fed by the selected audio source, to the audio outputting portion 110.

The audio outputting portion 110 is provided with: a signal processor 111 that processes a signal sent from the controller 106; and an amplifier 112 that amplifies a signal. The signal amplified by the amplifier 112 is output from a speaker 113 connected.

The controller 106 reads a program or the like stored in the RAM 107, and controls each part of the audio apparatus 100.

The microphone is a hands-free type, and is provided in the audio apparatus 100. The controller 106 outputs the audio input from the microphone through a connector 310 to a wireless communication sender/receiver 212 of the navigation apparatus 200. The audio output from the wireless communication sender/receiver 212 is sent to communications equipment of an apparatus to be communicated with.

In addition, the controller 106 controls the supply of the power supplied from an in-vehicle battery 10 mounted in a vehicle, to the navigation apparatus 200.

Further, the controller 106 is fed with a vehicle speed pulse, an illumination power signal, ACC (accessory power) signal, or the like, and performs processing according to the signal. The vehicle speed pulse is output to a controller 208 of the navigation apparatus 200 from the controller 106.

The navigation apparatus 200 includes: a display portion 201; an operating portion 202; a map storage portion 203; a power switch 204; a GPS (Global Positioning System) antenna 205; a speaker 206; the controller 208; a RAM 209; a charge circuit 210; a built-in battery 211; the wireless communication sender/receiver 212; and a wireless antenna 213.

The GPS antenna 205 receives a GPS signal from a satellite, and the GPS signal received by the GPS antenna 205 is output to the controller 208. The controller 208 determines the position of the vehicle based on the GPS signal fed by the satellite (GPS navigation).

The map storage portion 203 stores map data, and the map data read from the map storage portion 203 is decoded by a decoder (not shown). The decoder is connected to the controller 208, and the controller 208 performs a so-called map matching process that matches the vehicle position determined with the map data. By the map matching process, map image data is to be created such that the vehicle position is indicated with accuracy. Such created map image data is displayed on the display portion (main display) 201 by the control of the controller 208.

Also, an operation signal applied from the operating portion 202 is input into the controller 208, and then the processing is performed by the controller 208 in accordance with the operation signal. For example, a destination is set according to the instruction by operating the operating portion 202, the controller 208 searches for a most appropriate route from the vehicle position to the destination and displays the route with the map on the display portion 201 as a guiding route. Also, the audio guidance of the navigation apparatus 200 is output from the speaker 206 by the control of the controller 208. Here, when the navigation apparatus 200 is attached to the audio apparatus 100, the audio guidance of the navigation apparatus 200 is output from the speaker 113 connected to the audio apparatus 100.

In addition thereto, the controller 208 is capable of displaying the music information of the audio apparatus 100 on the display portion (main display) 201, by operating the operating portion 202 or 102.

The navigation apparatus 200 further includes: the charge circuit 210 that charges in the built-in battery 211, the power supplied by the control of the controller 106 of the audio apparatus 100; and the built-in battery 211 that supplies the power to the navigation apparatus 200, when the navigation apparatus 200 is removed from the audio apparatus 100 or when there is no power supplied from the in-vehicle battery 10.

The navigation apparatus 200 is also provided with: the wireless antenna 213; and the wireless communication sender/receiver 212, and is configured to acquire traffic information such as traffic congestion prediction or the like, from a center, not shown. The traffic information is used for selecting a route at the time of navigation.

It is also possible to utilize as a hands-free function, by receiving the sound on communication from a telephone to be communicated with and outputting the sound on communication from the microphone 103 in connection with the audio apparatus 100.

The audio apparatus 100 and the navigation apparatus 200 are connected by multiple signal lines such as a control line, a power line, and the like. The connector portion 300 has the connector 310 of the audio apparatus side and a connector 320 of the rear face of the navigation apparatus side. When the connectors are in connection, the aforementioned multiple signal lines are connected.

Also, the connector portion 300 is provided with a detecting circuit 370 that detects whether or not the navigation apparatus 200 is connected to the connector portion 300. The configuration of the detecting circuit 370 is shown in FIG. 4.

Figure 4:
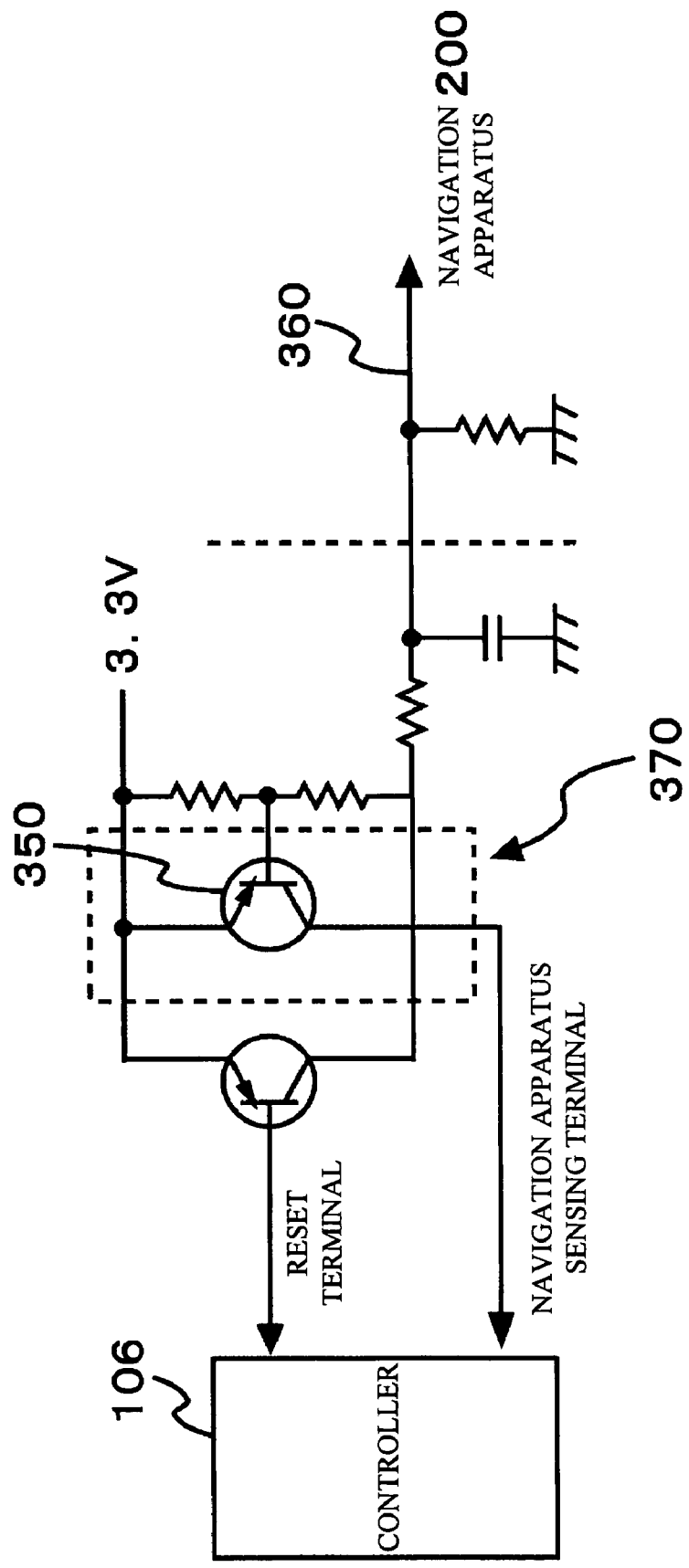
FIG. 4 shows a configuration of a detecting circuit.

A transistor 350 shown in FIG. 4 is off, while the navigation apparatus 200 is not in connection with a power line 360 supplying power to the navigation apparatus 200. For this reason, the voltage supplied to the controller 106 of the audio apparatus 100 is 0 V. When the navigation apparatus 200 is connected to the power line 360, the transistor 350 turns on and a voltage of 3.3 V is supplied to the controller 106 of the audio apparatus 100 from the power supply.

When an output voltage of a navigation apparatus sensing terminal connecting the transistor 350 and the controller 106 is 3.3 V, the controller 106 senses a connected state. When the output voltage is 0 V, the controller 106 senses as unconnected state.

As shown in FIG. 2B, the audio apparatus 100 further includes a removable switch (SW) 301. By pushing the removable switch 301, the navigation apparatus 200 is taken out of the front face panel 150 of the audio apparatus 100 along a front direction of the audio apparatus 100.

The navigation apparatus 200 employed in the present exemplary embodiment has the power switch 204 that can switch on and off of the navigation apparatus 200 at a top face of a chassis, as shown in FIG. 2B, and the power switch 204, located on a periphery face of the navigation apparatus 200 other than the display portion 201, cannot be operated with the navigation apparatus 200 attached to the audio apparatus 100.

Accordingly, the power of the navigation apparatus 200 is switched between on and off, at a timing of switching between on and off of the ACC power supplied from the vehicle main body, or at a timing of attaching or detaching the navigation apparatus 200 to or from the audio apparatus 100.

Here, power-on to be described below means that the audio apparatus 100 and the navigation apparatus 200 have an operable state any time including a stand-by state.

Table 1 shows power states of the navigation apparatus 200, when the navigation apparatus 200 is attached to the audio apparatus 100.

TABLE 1

|  |  | State of navigation apparatus | |
| --- | --- | --- | --- |
|  |  | Power ON | Power OFF |
| State of audio apparatus | ACC ON | Keep PWR ON Operation by built-in battery →operation by supplied power/ charge | PWR OFF→ON operation start by supplied power/ charge |
|  | ACC OFF | Keep PWR ON Operation is continued by built-in battery (no charge) | Keep PWR OFF Keep no supplied power/no charge |

Firstly, when the navigation apparatus 200 is attached to the audio apparatus 100 with the ACC power on (the audio apparatus 100 is powered on) and the navigation apparatus 200 on, the navigation apparatus 200 keeps ON state of the power supply and changes the source of power supply from the built-in battery 211 to the in-vehicle battery 10. Also, the navigation apparatus 200 charges the power supplied from the in-vehicle battery 10 in the built-in battery 211.

Next, when the navigation apparatus 200 is attached to the audio apparatus 100 with the ACC power on (the audio apparatus 100 is powered on) and the navigation apparatus 200 off, the controller 106 of the audio apparatus 100 supplies the power from the in-vehicle battery 10 to power on the navigation apparatus 200, and also charges the built-in battery 211 of the navigation apparatus 200.

Then, when the navigation apparatus 200 is attached to the audio apparatus 100 with the ACC power off (the audio apparatus 100 is powered off) and the navigation apparatus 200 on, the navigation apparatus 200 is activated by the power of the built-in battery 211.

In addition, when the navigation apparatus 200 is attached to the audio apparatus 100 with the ACC power off (the audio apparatus 100 is powered off) and the navigation apparatus 200 off, the audio apparatus 100 and the navigation apparatus 200 keeps OFF state.

Table 2 shows power states of the navigation apparatus 200, when the navigation apparatus 200 is detached from the audio apparatus 100.

TABLE 2

|  |  | State of navigation apparatus | |
| --- | --- | --- | --- |
|  |  | Power ON | Power OFF |
| State of audio apparatus | ACC ON | Keep PWR ON Operation by charge → Operation by built-in battery | Keep PWR OFF Charge→no charge |
|  | ACC OFF | Keep PWR ON Operation is continued by built-in battery | Keep PWR OFF Keep no supplied power/no charge |

Firstly, when the navigation apparatus 200 is detached from the audio apparatus 100 with the ACC power on (the audio apparatus 100 is powered on) and the navigation apparatus 200 on, the power supplied to the navigation apparatus 200 from the in-vehicle battery 10 is stopped and the navigation apparatus 200 is activated by the built-in battery 211.

Also, when the navigation apparatus 200 is detached from the audio apparatus 100 with the ACC power on (the audio apparatus 100 is powered on) and the navigation apparatus 200 off, the built-in battery 211 stops being charged with the power of the navigation apparatus 200 kept OFF.

Next, when the navigation apparatus 200 is detached from the audio apparatus 100 with the ACC power off (the audio apparatus 100 is powered off) and the navigation apparatus 200 on, the navigation apparatus 200 is activated by the built-in battery 211 without change.

Then, when the navigation apparatus 200 is detached from the audio apparatus 100 with the ACC power off (the audio apparatus 100 is powered off) and the navigation apparatus 200 off, the navigation apparatus 200 keeps OFF state.

Table 3 shows changes of the power states of the navigation apparatus 200, when the state of the ACC power is changed with the navigation apparatus 200 attached to the audio apparatus 100.

TABLE 3

|  |  | State of navigation apparatus | |
|---|---|---|---|
|  |  | Power ON | Power OFF |
| State of audio apparatus | ACC OFF→ ON | Keep PWR ON Operation by built-in battery →Operation by supplied power/charge | PWR OFF→ON Operation start by supplied power/charge |
|  | ACC ON→ OFF | Keep PWR ON→OFF Operation by supplied power/charge →No supplied power/no charge | Keep PWR OFF Charge→no charge |

Firstly, when the ACC power is changed from OFF to ON (the audio apparatus 100 is changed from OFF to ON) with the navigation apparatus 200 on, the navigation apparatus 200 that has been activated by the built-in battery 211 is activated by the power supplied from the in-vehicle battery 10. At the same time, the built-in battery 211 is charged by the power supplied by the in-vehicle battery 10.

Next, when the ACC power is changed from OFF to ON (the audio apparatus 100 is changed from OFF to ON) with the navigation apparatus 200 off, the power is supplied to the navigation apparatus 200 by the in-vehicle battery 10 to activate the navigation apparatus 200. At the same time, the built-in battery 211 is charged by the power supplied by the in-vehicle battery 10.

Then, when the ACC power is changed from ON to OFF (the audio apparatus 100 is changed from ON to OFF) with the navigation apparatus 200 on, the power supplied from the in-vehicle battery 10 to the navigation apparatus 200 is stopped, and the navigation apparatus 200 is activated by the power supplied by the built-in battery 211.

After that, when the ACC power is changed from ON to OFF (the audio apparatus 100 is changed from ON to OFF) with the navigation apparatus 200 off, the power of the navigation apparatus 200 is kept off to stop charging the built-in battery 211.

Next, a description will be given of a procedure of the controller 106 of the audio apparatus 100 and that of the controller 208 of the navigation apparatus 200 to accomplish the above-mentioned operations.

Firstly, referring to the flowchart shown in FIG. 5, a description will be given of the procedure of the controller 106 of the audio apparatus 100 that has detected a connection of the navigation apparatus 200. This process flow is implemented in a state where the audio apparatus 100 is supplied with power and becomes operable.

When detecting that the navigation apparatus 200 is in connection (step S1), the controller 106 of the audio apparatus 100 determines whether or not the navigation apparatus 200 is powered on (step S2). The controller 106 of the audio apparatus 100 determines whether or not it is possible to communicate with the controller 208 of the navigation apparatus 200 so as to determine whether or not the navigation apparatus 200 is powered on.

When the navigation apparatus 200 is powered on (step S2/YES), the controller 106 outputs a request signal for switching the power supply for activation from the built-in battery 211 to the in-vehicle battery 10 (step S3). When the communication with the controller 208 of the navigation apparatus 200 is completed, the power of the in-vehicle battery 10 is supplied to the navigation apparatus 200 (step S4).

When the navigation apparatus 200 is not powered on (step S2/NO), the controller 106 outputs an activation signal to the navigation apparatus 200 to activate the navigation apparatus 200 (step S5), and the power of the in-vehicle battery 10 is supplied to the navigation apparatus 200 (step S6).

Figure 6:
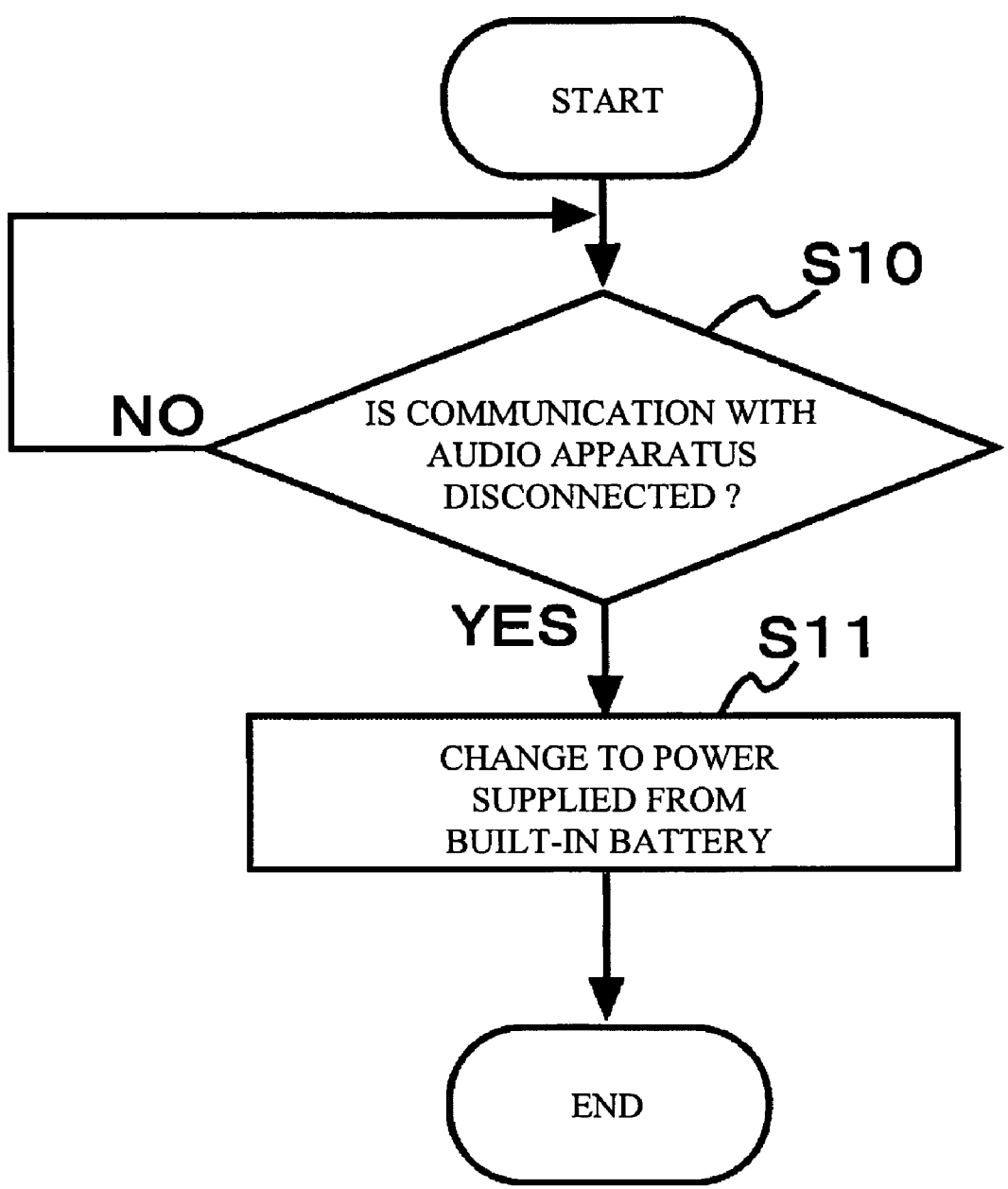
FIG. 6 is a flowchart showing a procedure of the controller of the navigation apparatus when the navigation apparatus is disconnected from the audio apparatus.

Next, a description will be given of the procedure of the controller 208 of the navigation apparatus 200 when the navigation apparatus 200 is detached from the audio apparatus 100, with reference to the flowchart shown in FIG. 6.

When the communication with the audio apparatus 100 is disconnected, the controller 208 of the navigation apparatus 200 senses that the navigation apparatus 200 is detached from the audio apparatus 100 (step S10). When the removal from the audio apparatus 100 is detected, the controller 208 of the navigation apparatus 200 changes the power supplied to the power supplied from the built-in battery 211 (step S11). That is to say, when the navigation apparatus 200 is removed from the audio apparatus 100, the navigation apparatus 200 is operated by the power supplied from the built-in battery 211 on the basis of on or off state of the power switch 204.

Next, a description will be given of a procedure of the controller 106 of the audio apparatus 100 when the ACC power of a vehicle is changed from off to on with the navigation apparatus 200 attached to the audio apparatus 100, with reference to the flowchart shown in FIG. 7.

The ACC power of the vehicle is changed from off to on (step S21/YES) and the power switch of the audio apparatus 100 is turned on (step S22/YES), the controller 106 of the audio apparatus 100 determines whether or not the navigation apparatus 200 is powered on (step S23). When the navigation apparatus 200 is powered on (step S23/YES), the controller 106 outputs a request signal for changing the power supply for activation from the built-in battery 211 to the in-vehicle battery 10, to the controller 208 of the navigation apparatus 200 (step S24). When the communication with the controller 208 of the navigation apparatus 200 is completed, the controller 106 supplies the power of the in-vehicle battery 10 to the navigation apparatus 200 (step S25).

In addition, when the navigation apparatus 200 is not powered on (step S23/NO), the controller 106 outputs an activation signal to the navigation apparatus 200 to activate the navigation apparatus 200 (step S26) and the power of the in-vehicle battery 10 is supplied to the navigation apparatus 200 (step S27).

As described heretofore, when the navigation apparatus 200, which has been used after being detached from the audio apparatus 100, is attached to the audio apparatus 100, the power of the navigation apparatus is to be powered on. Therefore, if a user inputs a destination or the like, brings the navigation apparatus into a vehicle, and mounts the navigation apparatus in the audio apparatus, the navigation apparatus is automatically powered on. Accordingly, the navigation apparatus can be used at once, and the user-friendliness can be improved.

When the navigation apparatus 200 is removed from the audio apparatus 100 with the navigation apparatus 200 powered on, the navigation apparatus 200 keeps on continuously. This allows a user to use the audio apparatus 100 continuously after the navigation apparatus 200 is removed from the audio apparatus 100.

In addition, while the navigation apparatus 200 is being fed with the power supplied from the in-vehicle battery 10, the built-in battery 211 of the navigation apparatus 200 is charged. Therefore, the built-in battery 211 can be charged without cumbersome operations.

Further, when the audio apparatus 100 is powered on (the ACC of the vehicle is powered on), the navigation apparatus 200 is powered on when attached to the audio apparatus 100. This eliminates the necessity of the power switch arranged at a front face of the navigation. Hence, the design performance of the navigation apparatus 200 can be improved. Also, it is possible to enhance the flexibility of the arrangement of the power switch 204 in a substrate.

Figure 5:
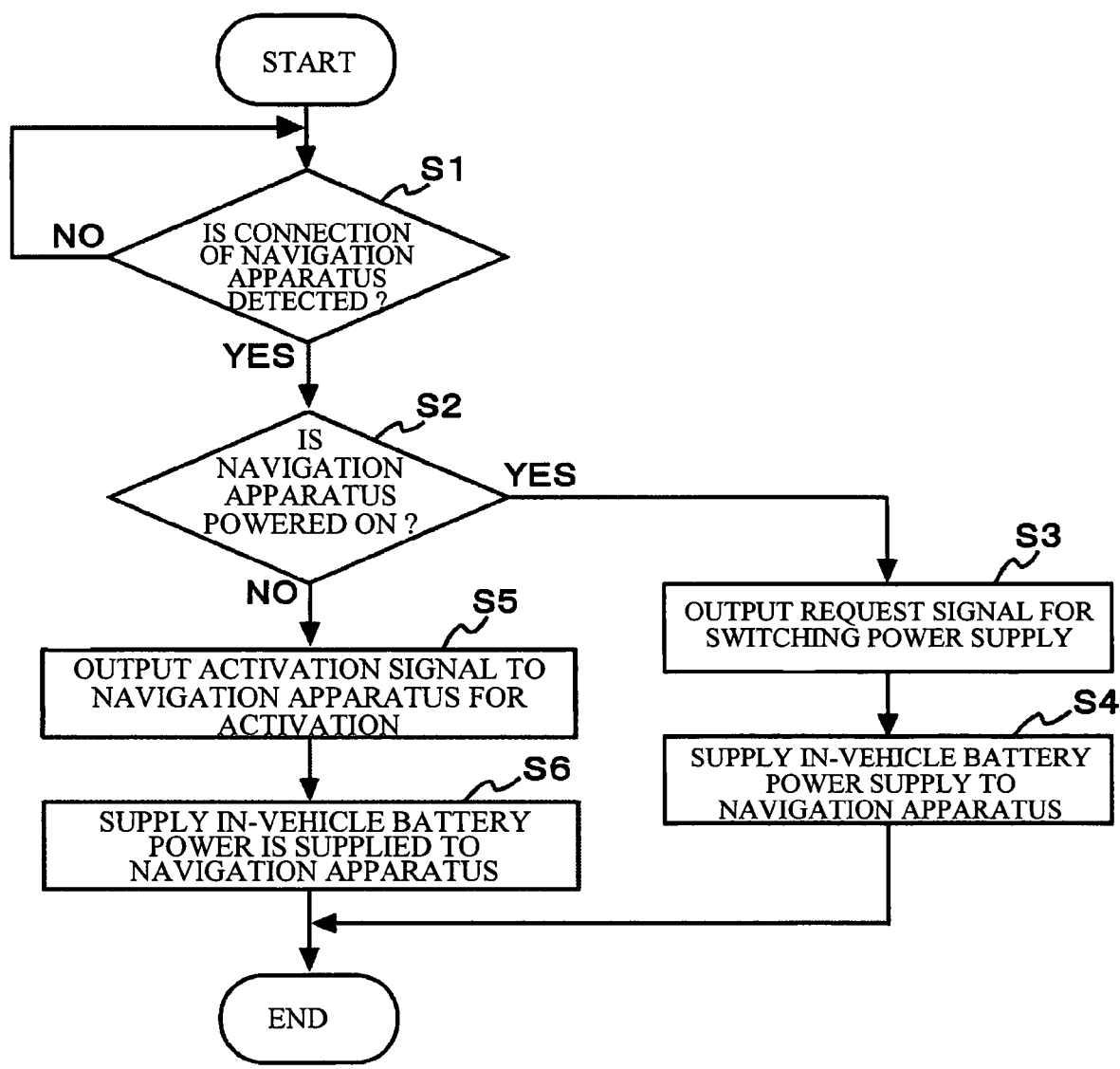
FIG. 5 is a flowchart showing a procedure of a controller of the audio apparatus that has detected a connection of the navigation apparatus.
Figure 7:
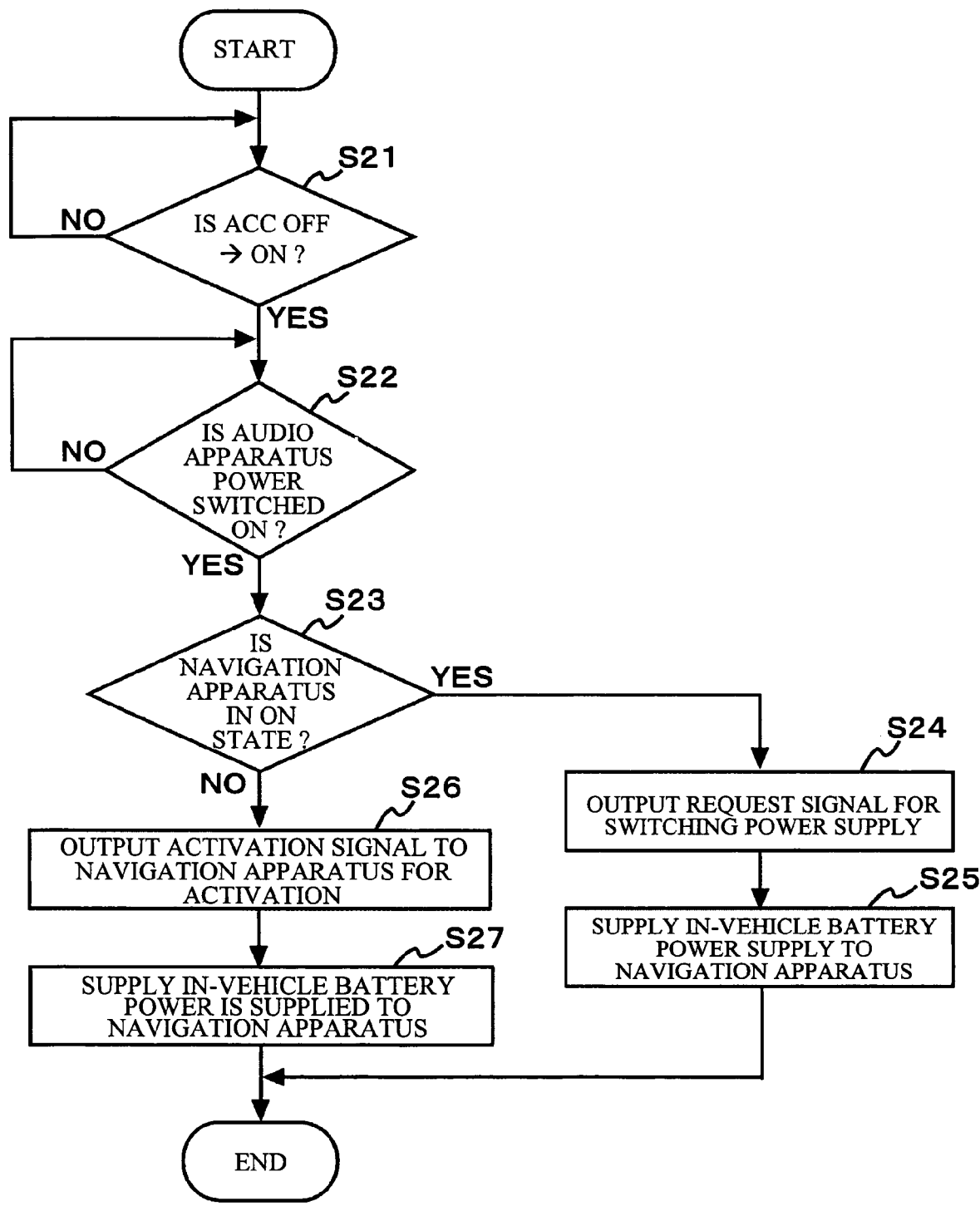
FIG. 7 is a flowchart showing a procedure of the controller of the audio apparatus when the ACC power of the vehicle is changed from off to on with the navigation apparatus attached to the audio apparatus.

For example, as a modification of the procedures shown in FIG. 5 and FIG. 7, the activation state (ON/OFF) may be switched according to the state of the power supplied from the battery connected by the navigation apparatus 200, instead of the request signal fed from the audio apparatus 100. That is to say, when the power starts to be supplied, the navigation apparatus 200 automatically starts to be charged.

In addition, in the above-described audio and navigation system 1, the controller 106 of the audio apparatus 100 functions as a main control apparatus; however, the controller 208 of the navigation apparatus 200 may function as the main control apparatus.

Furthermore, in the present exemplary embodiment, a description has been given of the in-vehicle apparatus serving as an audio apparatus and the portable electronic apparatus serving as a navigation apparatus; however, the in-vehicle apparatus may serve as the navigation apparatus and the audio apparatus may be attached thereto.

Although a few specific exemplary embodiments employed in the present invention have been shown and described, it would be appreciated by those skilled in the art that changes may be made in these exemplary embodiments without departing from the principles and spirit of the invention, the scope of which is defined in the claims and their equivalents.

What is claimed is:

1. An in-vehicle electronic system comprising:
an in-vehicle electronic apparatus mounted in a vehicle; and
a portable electronic apparatus detachably provided to the in-vehicle electronic apparatus,
wherein the portable electronic apparatus has a power switch provided at such a position that the power switch is only operable when the portable electronic apparatus is removed from the in-vehicle electronic apparatus, and the power switch is provided at a periphery face of the portable electronic apparatus other than a front face,
wherein the portable electronic apparatus has a connector, the connector is provided at a rear face of the portable electronic apparatus, and the portable electronic apparatus is detached from the in-vehicle electronic apparatus along a front direction of the in-vehicle electronic apparatus,
wherein a power of the in-vehicle electronic apparatus is capable of being switched on the condition that the portable electronic apparatus is removed from the in-vehicle electronic apparatus,
wherein the portable apparatus is switched on at the time the portable apparatus is attached to the in-vehicle apparatus powered on.

2. The in-vehicle electronic system as claimed in claim 1, wherein the in-vehicle electronic apparatus causes the portable electronic apparatus to be operable, when the in-vehicle electronic apparatus being operable detects attachment of the portable electronic apparatus.

3. The in-vehicle electronic system as claimed in claim 1, wherein when the in-vehicle electronic apparatus is operable with power being supplied by a main body of the vehicle and detects the attachment of the portable electronic apparatus, the power is supplied to the portable electronic apparatus from the main body of the vehicle.

4. The in-vehicle electronic system as claimed in claim 1, wherein the portable electronic apparatus is provided with a battery, and after being removed from the in-vehicle electronic apparatus, the portable electronic apparatus operates with the power supplied from the battery.

5. The in-vehicle electronic system as claimed in claim 1, wherein when the portable electronic apparatus is attached to the in-vehicle electronic apparatus, the battery is charged by the power supplied from the main body of the vehicle.

6. The in-vehicle electronic system as claimed in claim 1, wherein the power switch is provided at a periphery face of the portable electronic apparatus other than a front face thereof.

7. The in-vehicle electronic system as claimed in claim 1, wherein the power switch is provided at a top face of the portable electronic apparatus.

8. An in-vehicle electronic system comprising:
an in-vehicle electronic apparatus mounted in a vehicle; and
a portable electronic apparatus detachably provided to the in-vehicle electronic apparatus,
wherein the portable electronic apparatus has a power switch covered by the in-vehicle electronic apparatus when the portable electronic apparatus is attached to the in-vehicle electronic apparatus, and the power switch is provided at a periphery face of the portable electronic apparatus other than a front face,
wherein the portable electronic apparatus has a connector, the connector is provided at a rear face of the portable electronic apparatus, and the portable electronic apparatus is detached from the in-vehicle electronic apparatus along a front direction of the in-vehicle electronic apparatus,
wherein a power of the in-vehicle electronic apparatus is capable of being switched on the condition that the portable electronic apparatus is removed from the in-vehicle electronic apparatus,
wherein the portable apparatus is switched on at the time the portable apparatus is attached to the in-vehicle apparatus powered on.

9. The in-vehicle electronic system as claimed in claim 8, wherein the power switch is provided at a periphery face of the portable electronic apparatus other than a front face thereof.

10. The in-vehicle electronic system as claimed in claim 8, wherein the power switch is provided at a top face of the portable electronic apparatus.

11. The in-vehicle electronic system as claimed in claim 8, wherein the in-vehicle electronic apparatus causes the portable electronic apparatus to be operable, when the in-vehicle electronic apparatus being operable detects attachment of the portable electronic apparatus.

12. The in-vehicle electronic system as claimed in claim 8, wherein when the in-vehicle electronic apparatus is operable with power being supplied by a main body of the vehicle and detects the attachment of the portable electronic apparatus, the power is supplied to the portable electronic apparatus from the main body of the vehicle.

13. The in-vehicle electronic system as darned in claim 8, wherein the portable electronic apparatus is provided with a battery, and after being removed from the in-vehicle electronic apparatus, the portable electronic apparatus operates with the power supplied from the battery.

14. The in-vehicle electronic system as claimed in claim 8, wherein when the portable electronic apparatus is attached to the in-vehicle electronic apparatus, the battery is charged by the power supplied from the main body of the vehicle.

15. A portable electronic apparatus comprising:
a connector for connecting and disconnecting an in-vehicle electronic apparatus mounted in a vehicle; and
a power switch provided at such a position that the power switch is only operable when the connector is disconnected from the in-vehicle electronic apparatus,
wherein the power switch is provided at a periphery face of the portable electronic apparatus other than a front face,
wherein the connector is provided at a rear face of the portable electronic apparatus, and the portable electronic apparatus is detached from the in-vehicle electronic apparatus along a front direction of the in-vehicle electronic apparatus,
wherein a power of the in-vehicle electronic apparatus is capable of being switched on the condition that the portable electronic apparatus is removed from the in-vehicle electronic apparatus,
wherein the portable apparatus is switched on at the time the portable apparatus is attached to the in-vehicle apparatus powered on.

16. A portable electronic apparatus comprising:
a connector for connecting and disconnecting an in-vehicle electronic apparatus mounted in a vehicle; and
a power switch covered by the in-vehicle electronic apparatus when the connector is connected to the in-vehicle electronic apparatus,
wherein the power switch is provided at a periphery face of the portable electronic apparatus other than a front face,
wherein the connector is provided at a rear face of the portable electronic apparatus, and the portable electronic apparatus is detached from the in-vehicle electronic apparatus along a front direction of the in-vehicle electronic apparatus,
wherein a power of the in-vehicle electronic apparatus is capable of being switched on the condition that the portable electronic apparatus is removed from the in-vehicle electronic apparatus,
wherein the portable apparatus is switched on at the time the portable apparatus is attached to the in-vehicle apparatus powered on.

17. An in-vehicle electronic system comprising:
an in-vehicle electronic apparatus mounted in a vehicle; and
a portable electronic apparatus detachably provided to the in-vehicle electronic apparatus,
wherein when the portable electronic apparatus is attached to the in-vehicle electronic apparatus with the in-vehicle electronic apparatus powered off and the portable electronic apparatus is powered on, the portable electronic apparatus is activated by a power of a built-in battery,
when the portable electronic apparatus is attached to the in-vehicle electronic apparatus with the in-vehicle electronic apparatus powered off and the portable electronic apparatus is powered off, the portable electronic apparatus remains in an off state, and
the portable electronic apparatus has a power switch provided at such a position that the power switch is only operable when the portable electronic apparatus is removed from the in-vehicle electronic apparatus,
wherein a power of the in-vehicle electronic apparatus is capable of being switched on the condition that the portable electronic apparatus is removed from the in-vehicle apparatus,
wherein the portable apparatus is switched on at the time the portable apparatus is attached to the in-vehicle apparatus powered on.

18. An in-vehicle electronic system comprising:
an in-vehicle electronic apparatus mounted in a vehicle; and
a portable electronic apparatus detachably provided to the in-vehicle electronic apparatus,
wherein when the portable electronic apparatus is attached to the in-vehicle electronic apparatus with the in-vehicle electronic apparatus powered off and the portable electronic apparatus is powered on, the portable electronic apparatus is activated by a power of a built-in battery,
when the portable electronic apparatus is attached to the in-vehicle electronic apparatus with the in-vehicle electronic apparatus powered off and the portable electronic apparatus is powered off, the portable electronic apparatus remains in an off state, and
the portable electronic apparatus has a power switch covered by the in-vehicle electronic apparatus when the portable electronic apparatus is attached to the in-vehicle electronic apparatus,
wherein a power of the in-vehicle electronic apparatus is capable of being switched on the condition that the portable electronic apparatus is removed from the in-vehicle apparatus,
wherein the portable apparatus is switched on at the time the portable apparatus is attached to the in-vehicle apparatus powered on.

* * * * *